(12) United States Patent
Scott et al.

(10) Patent No.: US 7,703,375 B1
(45) Date of Patent: Apr. 27, 2010

(54) COMPOSITE ARMOR WITH A CELLULAR STRUCTURE

(75) Inventors: Brian R. Scott, Middletown, DE (US); Nabil F. Grace, Rochester Hills, MI (US)

(73) Assignee: Lawrence Technological University, Southfield, MI (US)

( * ) Notice: Subject to any disclaimer, the term of this patent is extended or adjusted under 35 U.S.C. 154(b) by 0 days.

(21) Appl. No.: 11/504,343

(22) Filed: Aug. 15, 2006

(51) Int. Cl.
*F41H 5/02* (2006.01)

(52) U.S. Cl. .................... 89/36.02; 428/911; 89/915; 89/917

(58) Field of Classification Search ............... 89/36.02; 428/911
See application file for complete search history.

(56) References Cited

U.S. PATENT DOCUMENTS

| | | | | |
|---|---|---|---|---|
| 3,616,115 | A | | 10/1971 | Klimmek |
| 3,649,426 | A | * | 3/1972 | Gates ........................... 428/68 |
| 3,828,699 | A | * | 8/1974 | Bowen ......................... 109/80 |
| 4,061,815 | A | * | 12/1977 | Poole, Jr. .................... 428/215 |
| 4,186,648 | A | | 2/1980 | Clausen et al. |
| 4,198,454 | A | * | 4/1980 | Norton ........................ 428/117 |
| 4,251,579 | A | * | 2/1981 | Lee et al. ...................... 428/73 |
| 4,292,882 | A | * | 10/1981 | Clausen ..................... 89/36.02 |
| 4,307,140 | A | | 12/1981 | Davis |
| 4,404,889 | A | * | 9/1983 | Miguel ...................... 89/36.02 |
| 4,934,245 | A | * | 6/1990 | Musante et al. ............ 89/36.02 |
| 4,953,442 | A | | 9/1990 | Bartuski |
| 4,969,386 | A | | 11/1990 | Sandstrom et al. |
| 4,989,493 | A | * | 2/1991 | Blommer et al. ........... 89/36.02 |
| 5,032,466 | A | | 7/1991 | Cappa |
| 5,045,371 | A | | 9/1991 | Calkins |
| 5,114,772 | A | | 5/1992 | Vives et al. |
| H1061 | H | * | 6/1992 | Rozner et al. .............. 89/36.02 |
| 5,221,807 | A | | 6/1993 | Vives |
| 5,349,893 | A | | 9/1994 | Dunn |
| H1434 | H | | 5/1995 | Cytron |
| 5,456,156 | A | | 10/1995 | Semple |
| 5,471,905 | A | * | 12/1995 | Martin ....................... 89/36.02 |
| 5,686,689 | A | | 11/1997 | Snedeker et al. |
| 5,733,643 | A | * | 3/1998 | Green ........................ 428/217 |
| 5,918,309 | A | * | 7/1999 | Bachner, Jr. ................... 2/2.5 |
| 5,996,115 | A | | 12/1999 | Mazelsky |
| 6,009,789 | A | | 1/2000 | Lyons |
| 6,253,655 | B1 | | 7/2001 | Lyons et al. |

(Continued)

OTHER PUBLICATIONS

Saito, Makoto, "Carbon Fiber Composites In The Japanese Civil Engineering Market—Conventional Uses And Developing Products" SAMPE Journal, vol. 38, No. 5, Sep./Oct. 2002, pp. 20-25.

(Continued)

*Primary Examiner*—Bret Hayes
*Assistant Examiner*—Michael D David
(74) *Attorney, Agent, or Firm*—Dickson Wright PLLC

(57) ABSTRACT

A composite armor 10 is provided with a cellular structure 12 having a plurality of composite inserts 14 arranged in openings 20 provided in the cellular structure 12. A pair of laminate sheets are arranged on oppositely facing sides of the cellular structure 12 and covering the inserts 14. The laminate sheets 26 and 28 are bonded to the structure 12 and the inserts 14 by an adhesive. The cellular structure 12 includes a plurality of fibers extending continuously throughout the cellular structure 12.

20 Claims, 6 Drawing Sheets

U.S. PATENT DOCUMENTS

| | | | |
|---|---|---|---|
| 6,408,733 B1 | 6/2002 | Perciballi | |
| 6,408,734 B1 | 6/2002 | Cohen | |
| 6,497,966 B2 | 12/2002 | Cohen | |
| 6,532,857 B1 | 3/2003 | Shih et al. | |
| 6,601,497 B2 * | 8/2003 | Ghiorse et al. | 89/36.02 |
| 6,679,157 B2 * | 1/2004 | Chu et al. | 89/36.02 |
| 6,681,679 B2 * | 1/2004 | Vives et al. | 89/36.17 |
| 6,698,331 B1 * | 3/2004 | Yu et al. | 89/36.02 |
| 6,703,104 B1 * | 3/2004 | Neal | 428/118 |
| 6,792,843 B2 * | 9/2004 | Mohr et al. | 89/36.02 |
| 6,826,996 B2 | 12/2004 | Strait | |
| 6,860,186 B2 | 3/2005 | Cohen | |
| 6,892,623 B2 | 5/2005 | Benyami et al. | |
| 6,895,851 B1 * | 5/2005 | Adams et al. | 89/36.02 |
| 6,955,112 B1 * | 10/2005 | Adams et al. | 89/36.02 |
| 7,150,217 B2 * | 12/2006 | Kershaw | 89/36.05 |
| 2002/0088340 A1 * | 7/2002 | Chu et al. | 89/36.02 |
| 2002/0094406 A1 | 7/2002 | Cohen | |
| 2004/0020353 A1 | 2/2004 | Ravid et al. | |
| 2005/0072294 A1 | 4/2005 | Cohen | |
| 2007/0034074 A1 * | 2/2007 | Ravid et al. | 89/36.02 |
| 2007/0180982 A1 * | 8/2007 | Dagher et al. | 89/36.02 |
| 2007/0214951 A1 * | 9/2007 | Swinson | 89/36.04 |
| 2007/0238379 A1 * | 10/2007 | Bhatnagar et al. | 442/135 |
| 2008/0119099 A1 * | 5/2008 | Palley | 442/134 |

OTHER PUBLICATIONS

Nippon Steel Composite Co., Ltd. Brochure—FRP Grid FORCA TOWGR1D (4 pages).

Nefcom Corporation Brochure—FRP Reinforcing Bar NEFMAC (4 pages).

* cited by examiner

COMPOSITE ARMOR WITH A CELLULAR STRUCTURE

STATEMENT REGARDING FEDERALLY SPONSORED RESEARCH

This invention was made with Government support under Agreement No. W911NF-04-2-0032 awarded by ARL. The Government has certain rights in the invention.

BACKGROUND OF THE INVENTION

1. Field of the Invention

The present invention relates generally to armor used for preventing the penetration of structures by projectiles. More specifically, the invention relates to an improved armor including a fiber grid having composite tiles retained in the grid that together provide overall support to the structure being protected while also improving the armor performance of each individual composite tile.

2. Background of the Invention

Armor systems have been known to include thick metal as a skin of a structure being protected. For example, military vehicles have, for several years, included a thick metal plate on their exterior in order to reduce the likelihood of projectile penetration. Such thick metal armor systems while effective can also be extremely heavy and, as such, cause problems relating to vehicle speed, fuel consumption and vehicle assembly.

In some cases, these metal armor systems have been replaced with lighter weight armor systems made from composite materials having reinforced fibers made of, for example, Kevlar, S-2 glass, graphite, or high molecular weight polyethylene. Such armor systems have utilized these multiple layers of composite materials in order to achieve reduced overall weight, and provide sufficient structural properties, while preserving the ability of the armor to provide protection against penetration. For example, some known systems include the use of Kevlar in combination with two outer plates surrounding such Kevlar. Illustrative of such a composite armor system is disclosed in U.S. Pat. No. 4,186,648.

Also, armor systems using ceramic plates in connection with a grid are well known in the art as capable of providing protection against penetrating high speed projectiles while providing a reduction in the overall weight of the armor system. The ceramic plates have been known to have convex surfaces. U.S. Pat. No. 6,826,996 discloses convex plates inserted into a honeycomb grid. Upon impact by a projectile into such ceramic plates, it has been known that managing the propagation of cracks from the impacted plate to an adjacent plate is critical.

The prior art grids are made of steel, fiber, or composite materials and are used in connection with holding ceramic plates inserted into openings formed by such grid structures. For example, U.S. Pat. No. 5,456,156 discloses a grid structure made of metal strips. The openings have been known to be either blind openings, opening only to one side of the grid, or, through holes, open to both sides of the grid. The openings of such grids have been shaped in many different forms including, for example, squares, triangles, and hexagons. The grid structure is usually designed with a material having an effective acoustic impedance lower than the ceramic plates in order to reduce the propagation of damaging stresses to adjacent ceramic plates.

In order to manage the propagation of such stresses, prior art armor systems have used auxiliary layers of laminate sheet material bonded to the front and the back of the grid structures. In some cases, only one laminate sheet has been bonded to either one of the front or the back of such grid structures. It has been known to make such laminate sheet material out of Kevlar. For example, U.S. Pat. No. 5,349,893 discloses a composite laminate sheet made of woven fiber in a resinous matrix. Such laminate sheet materials can be bonded to the grid structure with resins.

Illustrative of the prior art is U.S. Pat. No. 6,826,996 assigned to General Dynamics Land Systems, Inc. and Mofet Etzion Agricultural Cooperative Association Ltd. The '996 patent discloses a honeycomb grid structure having openings for receiving convex composite plates and a pair of preform sheets secured to both sides of the grid structure. The '996 patent discloses the honeycomb grid as made of material selected from the group consisting of stainless steel, aluminum, aramid sheet, fiber, or fabric.

Testing of such known armor systems having grid structures with composite inserts surrounded by preform sheets has revealed that the propagation of cracks and debris, created during impact, weakens the adjacent composite plates. The propagation of such cracks results from poorly designed grid structures failing to eliminate both crack propagation, debris, and stress wave propagation.

SUMMARY OF THE INVENTION

It is an object of the present invention to provide a composite armor that will prevent the penetration of projectiles in a structure while also providing structural support to the same structure.

More specifically, an object of the invention is to provide a composite armor having a one-piece integrally formed composite cellular structure for retaining composite inserts, which in combination with resins and laminates, prevents projectiles from penetrating a structure.

Another object of the present invention is to provide a uniform one-piece composite cellular structure made of continuous fibers providing high tensile strength in order to radially confine composite inserts used in connection with such grid.

Further scope and applicability of the present invention will become apparent from the following detailed description, claims and drawings. However, it should be understood that the specific examples in the detailed description are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
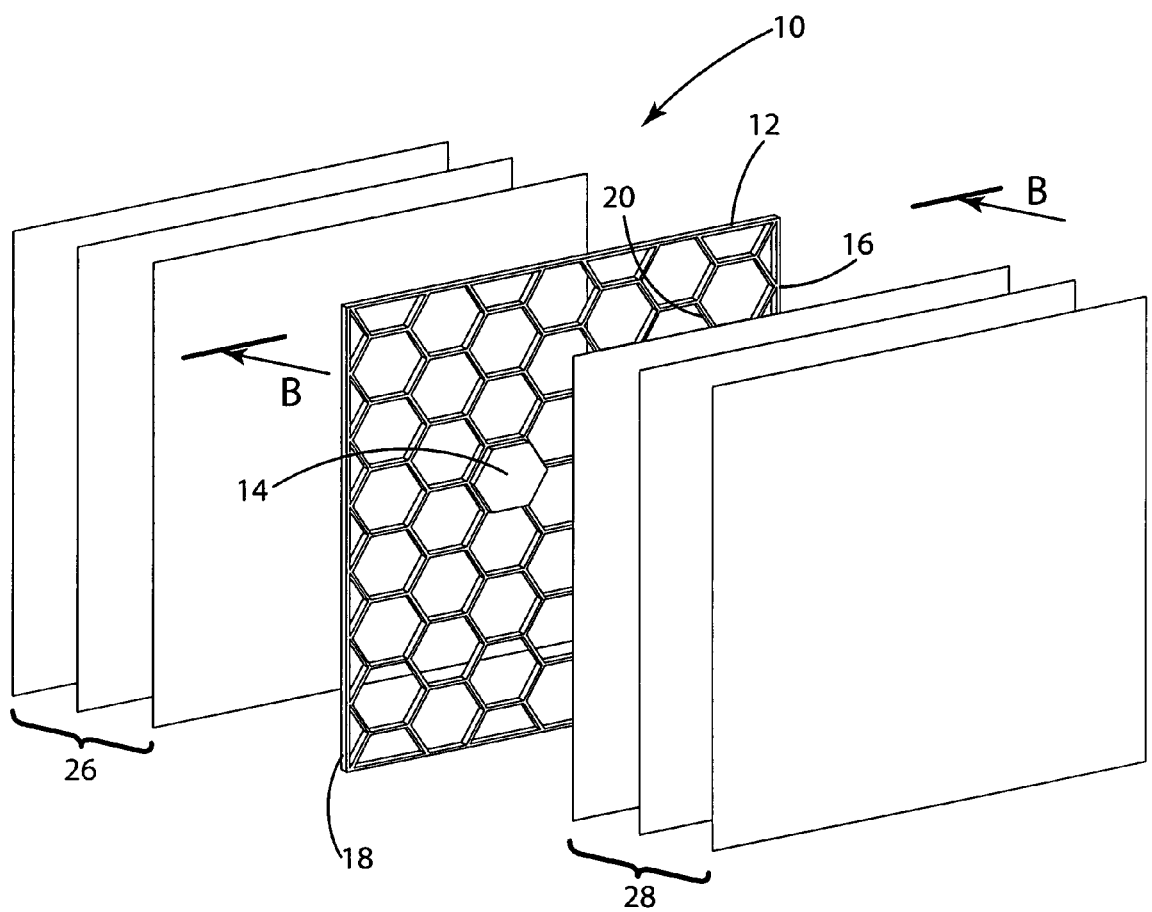
FIG. 1 is a three dimensional exploded view of the subject invention.

Referring now to the drawings, an armor system is shown in general at 10 in FIG. 1. The armor system 10 includes a cellular structure 12 having a plurality of openings 20 adapted to receive composite inserts 14. It should be appreciated that, although a plurality of openings for receiving inserts 14 are shown in this embodiment, it is possible to use any number of inserts 14 including, for example, only one insert 14. The cellular structure 12 includes a first side 16 and a second side 18 having openings 20 extending between each of the first and second sides 16 and 18 and adapted to receive the inserts 14. Although not shown, it is possible that the inserts 14 may be received in an opening 20 on only one side 16 of the cellular structure 12. The composite inserts 14 include first and second ends 22 and 24, respectively, and a perimeter portion 25.

The armor system 10 further includes a pair of laminates 26 and 28 secured to the cellular structure 12 and the composite inserts 14. The laminates 26, 28 are secured with the use of a bonding material such as a resin which may also be used as a filler applied on the inserts 14 and, in some cases, around at least a portion of the perimeter portion 25.

Figure 2:
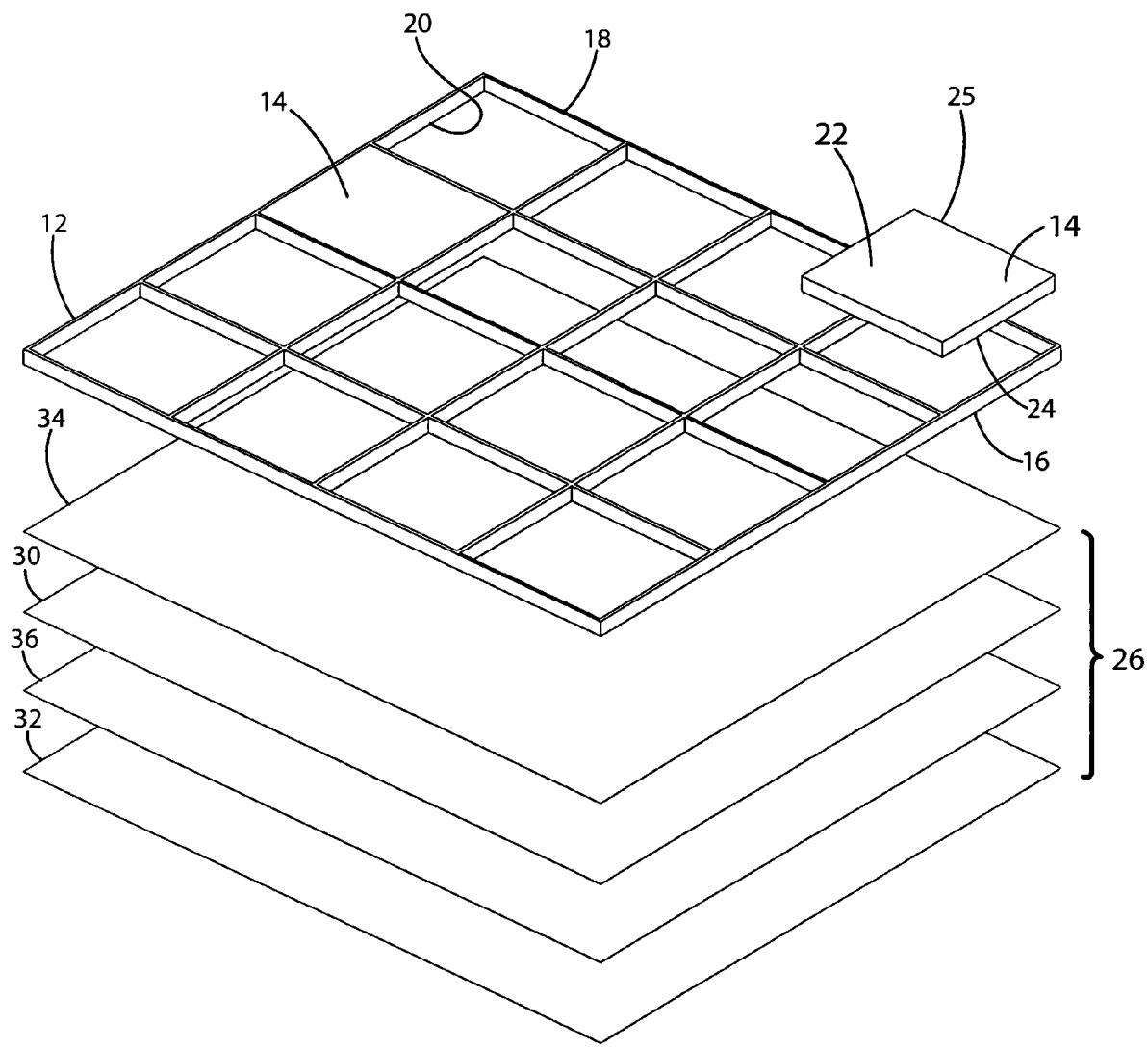
FIG. 2 is a three dimensional exploded view of a portion of the subject invention.

FIG. 2 shows only a portion of the armor system 10 including the cellular structure 12, the composite inserts 14 and the laminate 26 comprised of four layers of lamina 30, 32, 34, 36. In this embodiment, the laminate 26 includes a pair of high modulus laminates 30 and 32 made of a carbon fiber reinforced polymer and an additional pair of laminates 34 and 36 made of a hybrid ductile fabric. The laminate is layered extending away from the cellular structure 12 in an alternating manner including the hybrid ductile fabric lamina 34, high modulus lamina 30, hybrid ductile fabric lamina 36 and high modulus lamina 32, respectively. In the preferred embodiment, it has been found that materials having an acoustic impedance between $0.7 \times 10^6$ and $40 \times 10^6$ kg/m$^2$, as measured in a direction parallel to a normal of the laminate sheets, are most effective. It should be appreciated that, although FIG. 2 only shows a portion of the armor system 10 having the laminate 26 extending from only the first side 16 of the cellular structure 12, the armor system 10 may also include a similar laminate arrangement on the second side 18.

Figure 3:
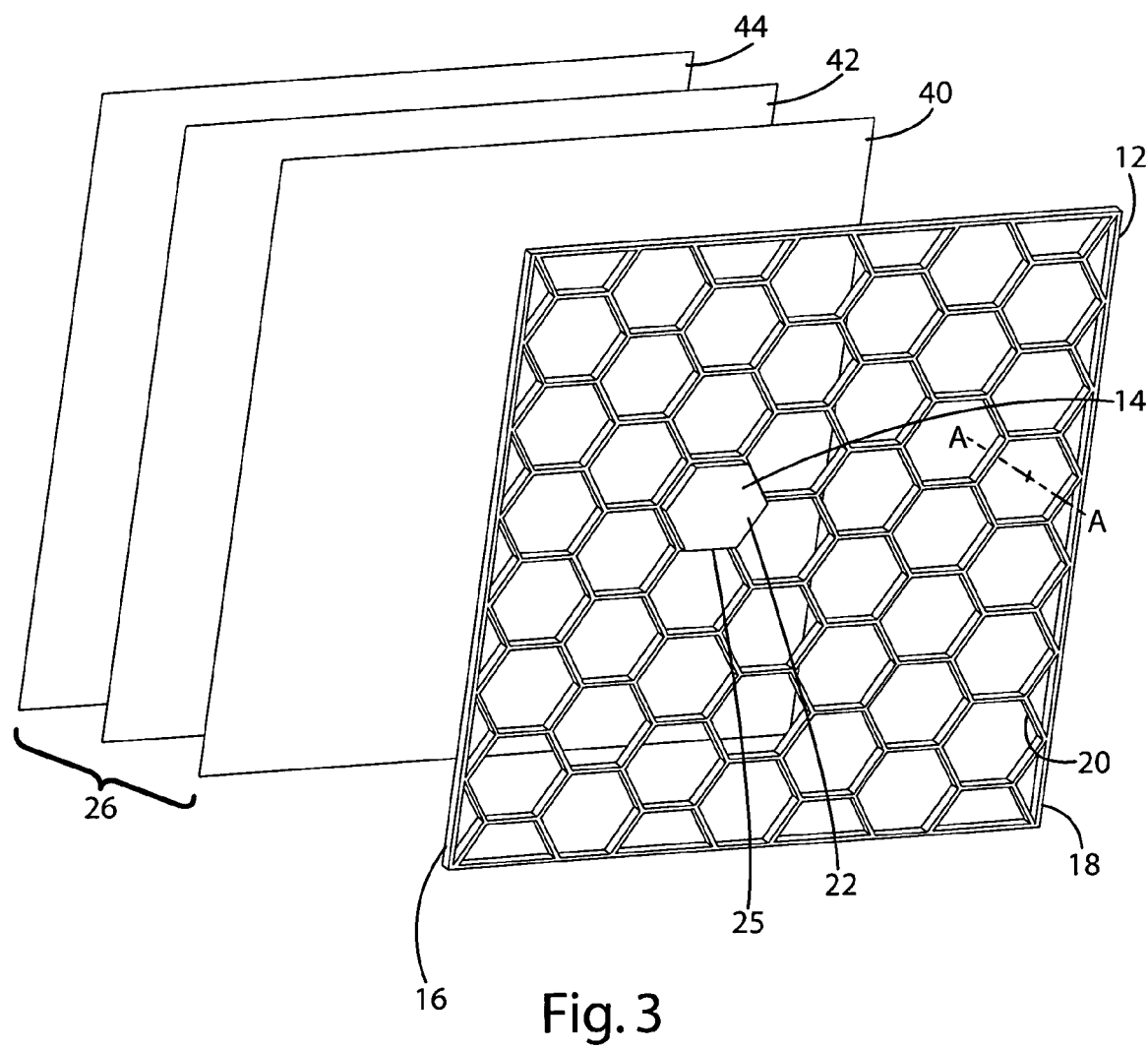
FIG. 3 is a three dimensional exploded view of a portion of the subject invention taken along lines B-B in FIG. 1.

Similar to FIG. 2, FIG. 3 only shows a portion of another embodiment of the armor system 10 having the laminate 26 comprised of three layers of lamina extending from only the first side 16 of the cellular structure 12 and, by way of example, only one of the composite inserts 14. In this embodiment, the laminate 26 includes a high modulus lamina 40, a hybrid ductile fabric lamina 42 and a fiberglass lamina 44, extending in a direction away from the cellular structure 12, respectively. It should be appreciated that, although FIG. 3 only shows a portion of the armor system 10 having the laminate 26 extending from only the first side 16 of the cellular structure 12, the armor system 10 may also include a similar laminate arrangement on the second side 18 of the cellular structure 12.

FIG. 3 also shows, by way of example, one of the composite inserts 14 partially inserted into an opening 20 of the second side 18. The composite inserts 14 can made of the materials consisting of the group of ceramic, glass, metal matrix, and ceramic matrix composite. In this embodiment, the composite insert 14 includes first and second surfaces 22 and 24 perpendicular to an axis A of the openings 20. In the preferred embodiment, the surfaces 22 and 24 have a minimum modulus of $2.0 \times 10^{10}$ N/m$^2$ as measured in a through thickness orientation. Although not shown in FIG. 3, it should be appreciated that the first and second surfaces 22 and 24, respectively, may have different surfaces including, for example, convex or concave surfaces. FIG. 3, in this embodiment, shows the insert 14 shaped as a hexagon. It should be appreciated that the shape of the inserts 14 may be of many differing kinds including, for example, square, oval, round, and triangular, provided that the openings 20 are accordingly shaped for receiving each of the inserts 14.

Figure 4:
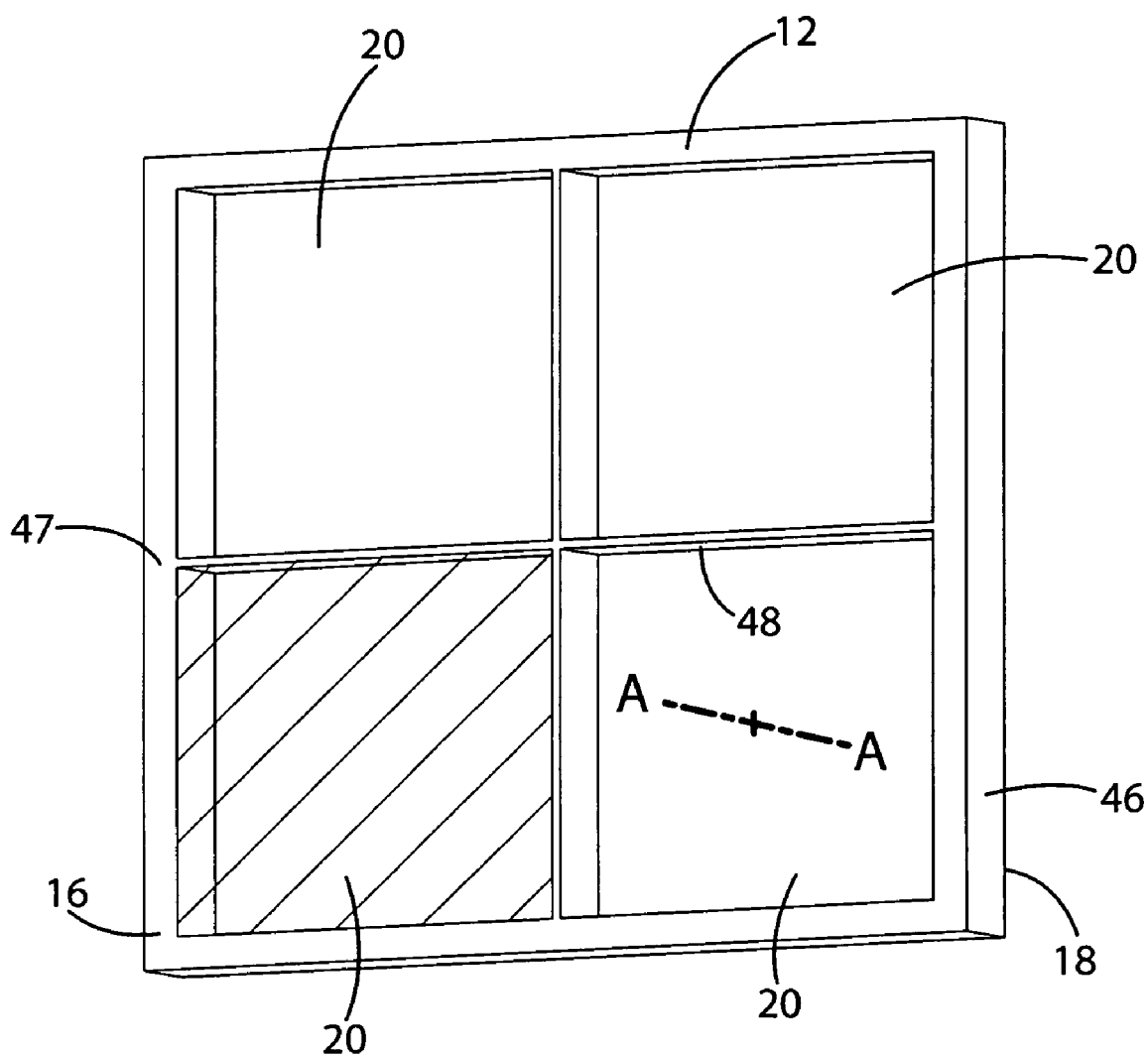
FIG. 4 is a three dimensional view of a cellular structure of the subject invention.

FIG. 4 shows the cellular structure 12 of the armor system 10. The cellular structure 12 includes, in this embodiment, four openings 20 extending between a first side 16 and a second side 18. The cellular structure 12 further includes outer walls 46 and inner walls 48. The outer walls 46 and inner walls 48 have a thickness extending in a direction parallel to axis A and a width 47 extending in a plane perpendicular to axis A. It should be appreciated that both the thickness and the width can be varied throughout the cellular structure 12. A thickness of approximately 1 inch and a width of 0.25 inches for the outer walls 46, along with a width of 0.0625 inches for the inner walls 48, has proven to be acceptable.

Figure 5:
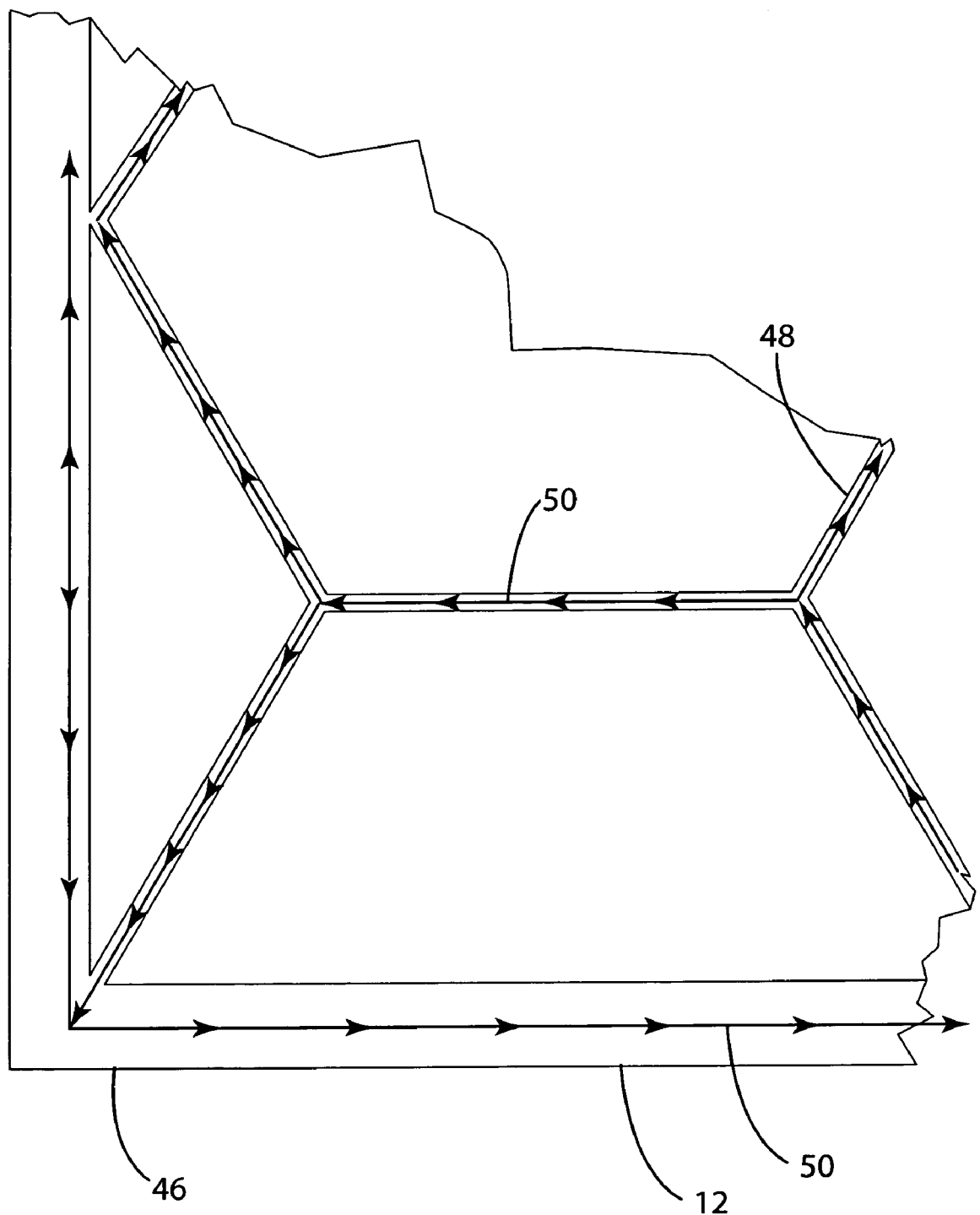
FIG. 5 is a plan view of a portion of the subject invention.

The cellular structure 12, as shown in FIG. 5, includes a plurality of carbon fiber reinforced polymer fibers 50 continuously extending throughout the cellular structure 12. It has been found that by placing the fibers 50 continuously throughout both the outer walls 46 and the inner walls 48, without any break in such fibers 50, that a high tensile strength is provided to the structure 12 to thereby reduce the lateral displacement of the composite inserts 14. It has been found that the fibers 50 should be made of a high strength modulus material selected from the group consisting of glass, carbon, and aramid. In the embodiment shown in FIG. 5, the fibers 50 are shown to extend in a counterclockwise orientation; however, it should be appreciated that the fibers 50 may also extend in other orientations such as a clockwise direction. Further, although not shown in FIG. 5, it should be appreciated that another embodiment of the cellular structure 12 for use in connection with structures needing less strength, may include the use of fibers continuously extending throughout the outer walls 46 only. In such an embodiment, it is possible that the inner walls 48 may separately have fibers 50 extending continuously throughout the inner walls 48 only.

Figure 6:
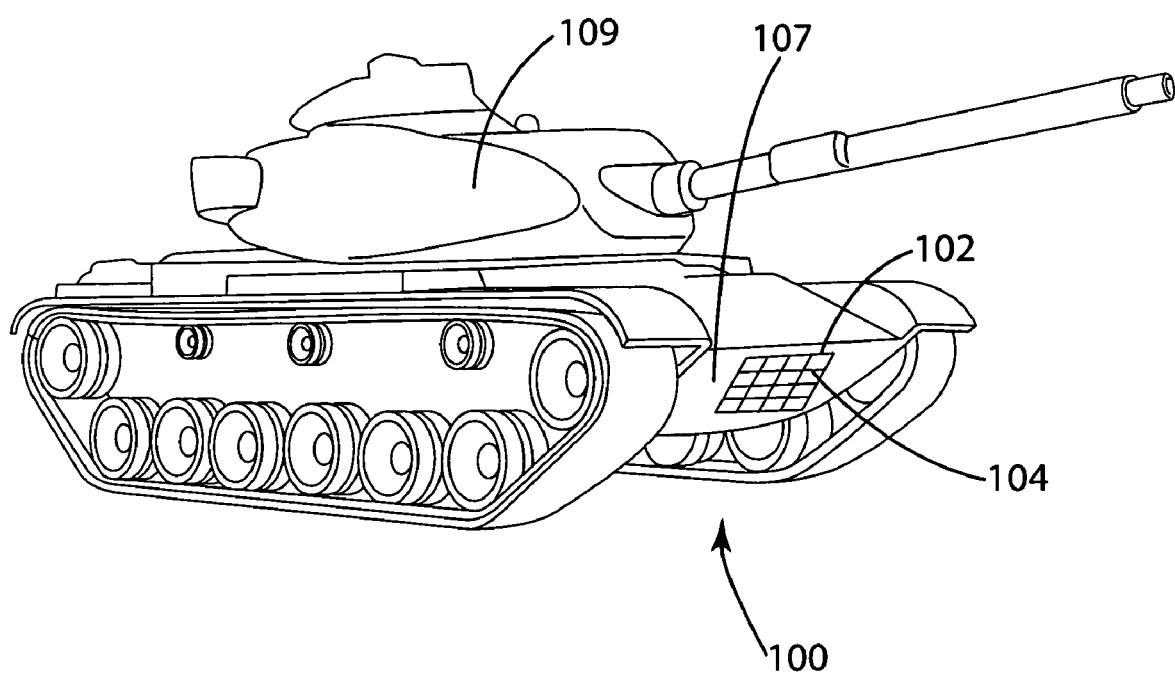
FIG. 6 is a side view of a vehicle structure having the present invention used on at least a portion of such vehicle.

The present invention 10 is generally shown at 100 in FIG. 6 on a vehicle structure. It should be appreciated that the present invention can be used in connection with many different structures and the example shown in FIG. 6 is only one example of such structures. In FIG. 6, a cellular structure 102 having a plurality of composite inserts 104 is shown in use with a floor pan 107 of a military vehicle 109. Although not shown in FIG. 6, it should be appreciated that several cellular structures 102 could also be assembled adjacent each other and throughout the entire floor pan 107. In this example, the present invention 100 provides protection against projectile penetration into the floor pan 107 while also providing structural support to the floor pan 107. It should be appreciated that this example shown in FIG. 6 is only one example provided to demonstrate that the present invention 100 provides both projectile protection for a structure and overall structure support to the same structure.

The present invention 10 is assembled according to the following steps. The cellular structure 12 is provided on a fixture used for holding the structure. The inserts 14 are inserted into the openings 20 of the structure 12 and a filler is applied to the inserts 14 including around at least a portion of the perimeter 25 of the inserts 14. At least one of the laminate sheets 26, 28 are applied over the structure 12 having the inserts 14 contained in the openings 20. A bonding resin is applied to the entire structure 12, having the inserts 14 in the openings 20 along with the filler and the laminate sheets, thereby created an assembly which is infused together. In the preferred embodiment, the infusing is achieved through the use of a known process referred to as Vacuum Assisted Resin Transfer Molding (VARTM). Although the VARTM infusion process is preferred, it should be appreciated that other methods of infusion may also be used.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A composite armor comprising: an integrally formed cellular structure having oppositely facing sides and a plurality of openings on at least one of said oppositely facing sides; a plurality of composite inserts received by said plurality of openings; a laminate sheet secured to at least one of the oppositely facing sides of the cellular structure to provide structural reinforcement and contain debris after impact; and wherein the integrally formed cellular structure includes continuously extending fibers, and wherein said continuously extending fibers include individual fibers extending continuously throughout said cellular structure without any break in said fibers.

2. The composite armor as claimed in claim 1, wherein said laminate sheet has an acoustic impedance of between $0.7 \times 10^6$ and $40 \times 10^6$ kg/m$^2$ as measured in a direction parallel to a normal of the laminate sheet.

3. The composite armor as claimed in claim 2, wherein said laminate sheet includes at least two different materials on each of said oppositely facing sides of said cellular structure.

4. The composite armor as claimed in claim 1, wherein said fibers are made of a high modulus strength material selected from the group consisting of glass, carbon, and aramid.

5. The composite armor as claimed in claim 1, wherein said composite insert includes first and second surfaces which are substantially perpendicular to an axis A of said opening.

6. The composite armor as claimed in claim 5, wherein said first and second surfaces include a minimum modulus of $2.0 \times 10^{10}$ N/m$^2$ measured in a through thickness orientation.

7. The composite armor as claimed in claim 1, wherein said opening
extends between both of said oppositely facing sides.

8. The composite armor as claimed in claim 1, wherein said composite insert includes a plurality of inserts spaced a predetermined distance from each other.

9. The composite armor as claimed in claim 1, wherein said cellular
structure includes an exterior wall portion and an interior wall portion.

10. The composite armor as claimed in claim 9, wherein said exterior wall portion and said interior wall portion have varying widths.

11. The composite armor as claimed in claim 1, wherein a filler is received in said opening of the cellular structure and adjacent to at least a portion of said composite insert.

12. The composite armor as claimed in claim 1, wherein at least one cellular structure is fixedly attached and made integral with a structure.

13. A composite armor comprising: an integrally formed cellular structure having oppositely facing sides and a plurality of openings on at least one of said oppositely facing sides, wherein said cellular structure is formed from continuous fibers, and wherein said continuous fibers include individual fibers extending continuously throughout said cellular structure without any break in said fibers; at least one composite insert received by said plurality of openings; and a laminate sheet secured to at least one of the oppositely facing sides of the cellular structure to provide structural reinforcement and contain debris after impact.

14. A composite armor comprising:
an integrally formed cellular structure having outer walls and inner walls having oppositely facing sides and a plurality of openings on at least one of said oppositely facing sides;
at least one composite insert received by said plurality of openings;
a laminate sheet secured to at least one of the oppositely facing sides of the cellular structure to provide structural reinforcement and contain debris after impact; and
wherein at least one of the inner walls and outer walls includes a plurality of continuously extending carbon fiber reinforced polymer fibers and wherein said fibers extend without any break in said fibers.

15. The composite armor as claimed in claim 14, wherein said fibers only extend continuously throughout the outer walls.

16. The composite armor as claimed in claim 14, wherein said fibers extend continuously throughout only the inner walls.

17. The composite armor as claimed in claim 14, wherein said fibers continuously extend throughout both said outer walls and said inner walls.

18. The composite armor as claimed in claim 14, wherein said fibers continuously extend throughout said outer walls and a plurality of separate fibers extend continuously throughout said inner walls.

19. The composite armor as claimed in claim 18, wherein said inner and outer walls are formed together as a single integrally formed cellular structure.

20. The composite armor as claimed in claim 14, wherein said fibers include individual fibers extending continuously throughout said cellular structure.

* * * * *